United States Patent [19]

Sato et al.

[11] Patent Number: 4,838,368

[45] Date of Patent: Jun. 13, 1989

[54] MANUAL COMBINATORIAL WEIGHING APPARATUS

[75] Inventors: Hirokazu Sato, Kyoto; Yasuhiro Goto, Ohtsu; Kazufumi Horiuchi, Uji; Yasuo Michibayashi, Ohtsu; Hideo Nobutsugu, Kyoto; Takumi Kawamura, Ohmihachiman, all of Japan

[73] Assignee: Ishida Scales Mfg. Co., Ltd., Kyoto, Japan

[21] Appl. No.: 131,627

[22] Filed: Dec. 10, 1987

[30] Foreign Application Priority Data

Dec. 10, 1986 [JP] Japan ................................ 61-294158
Dec. 10, 1986 [JP] Japan ................................ 61-294159
Mar. 19, 1987 [JP] Japan ................................ 62-064892
Mar. 19, 1987 [JP] Japan ................................ 62-064893
Mar. 19, 1987 [JP] Japan ................................ 62-064894
Apr. 18, 1987 [JP] Japan ................................ 62-095679

[51] Int. Cl.$^4$ ...................... G01G 13/00; G01G 21/28
[52] U.S. Cl. .................................... 177/25.18; 177/238
[58] Field of Search ............................. 177/25.18, 238

[56] References Cited

U.S. PATENT DOCUMENTS 4,442,910 4/1984 Mikami .............................. 177/25.18
4,511,009 4/1985 Kataoka ........................ 177/25.18 X
4,549,619 10/1985 Fujiwara ........................... 177/25.18

Primary Examiner—George H. Miller, Jr.
Attorney, Agent, or Firm—Staas & Halsey

[57] ABSTRACT

A manual combinatorial weighing apparatus having one or more weighing devices housed in a casing with each weighing device having a scale plate for placing articles thereon, and indicators associated with the weighing devices for indicating selected weighing devices. As many weighing devices in casings as desired by the user are provided in a desired layout. Weight data items of the articles put on the scale plates are combined to find a weight combination giving a desired total weight. The selected weighing devices are indicated by the indicators, which are held energized until the articles are removed from the selected weighing devices.

11 Claims, 15 Drawing Sheets

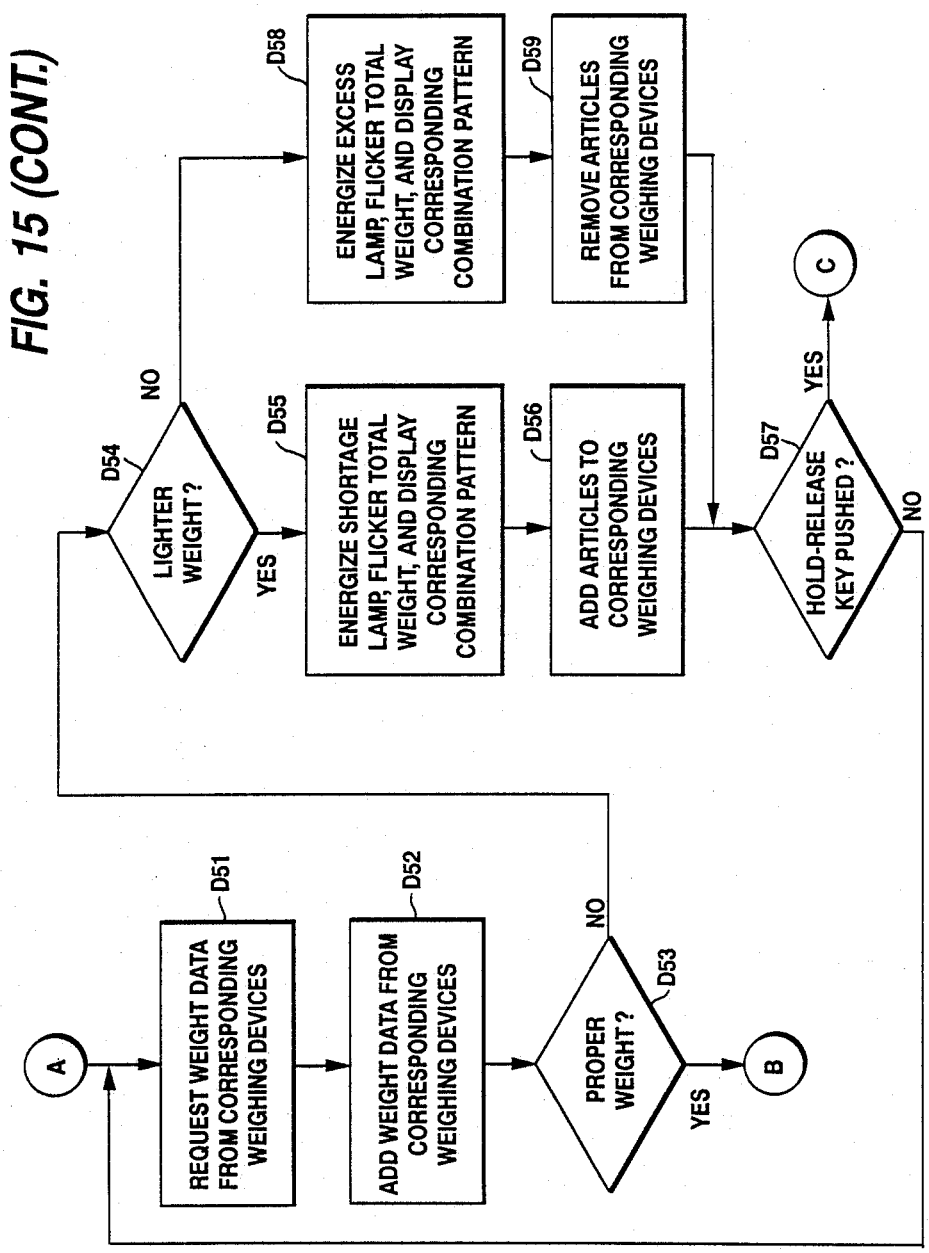

MANUAL COMBINATORIAL WEIGHING APPARATUS

BACKGROUND OF THE INVENTION

1. Field of the Invention

The present invention relates to a manual combinatorial weighting apparatus for manually placing batches of articles to be weighed on a plurality of scale plates and selecting a combination of article batches which exhibits a weight that is the same as or closest to a desired weight.

2. Description of the Prior Art

Large-scale supermarkets have packaging plants where articles or commodities are packaged. In some cases, a number of fish or fish or meat slices are packaged in a prescribed weight range.

Normally, fish slices or meat cuts are delivered on a belt converyor, and a plurality of weighing units including scale plates are disposed on a rack disposed on one side of the belt conveyor or on racks disposed on opposite sides of the belt conveyor. The fish slices or meat cuts are weighed as batches of artiches on the scale plates. The detected weight values of the batches of articles are combined in a number of ways, and a combination of article batches which has a weight value which is the same as or closest to a desired weight is selected. The scale plates carrying the selected combination of article batches are indicated, and the article batches are removed from those scale plates. There is known in the art a manual combinatorial weighing apparatus including a control unit which can carry out the above combinatorial weighing procedure, as disclosed in Japanese Utility Model Publication No. 61-35932 and Japanese Laid-Open Utility Model No. 56-170728.

In the above manual combinatorial weighing apparatus, five to ten, or more, scale plates and weighing units are mounted on a narrow elongate rack or racks, and the belt conveyor for feeding the articles is attached to the rack or racks. Therefore, the manual combinatorial weighing apparatus is elongate and large in size. This is disadvantageous in that the freedom to install the manual combinatorial weighing apparatus in a plant is small, and there are large limitations on the installation of the manual combinatorial weighing apparatus. Each of the weighing units must be kept horizontal, resulting in a complex adjustment process.

When weighing units are selected as giving a combination of article batches exhibiting a desired weight, indicator lamps are energized. The indicator lamps are de-energized when the articles are taken away from the scale plates. The timing of de-energizing the indicator lamps is critical. If the indicator lamps were de-energized before the articles are completely removed from the scale plates, e.g., if the indicator lamps were turned off immediately after the articles are grabbed by the operator, the operator would tend to place articles again on the scale plates in error. Some conventional manual combinatorial weighing apparatus have failed to fully control the indicator lamps.

In certain manual combinatorial weighing apparatus, when a batch combination giving a desired weight is found, a command signal is applied to the indicator lamps of those weighing units which are selected as providing such a batch combination to hold the indicator lamps energized for a certain period of time. The indicator lamps are de-energized only when all of the articles are completely removed from the selected scale plates so that the displyed weights are cleared to zero or a negative value. If a small amount of sticky food materials such as daily dishes or soft cheese, for example remains on a scale plate, the indicator lamp therefor is not de-energized, and a next weighing cycle cannot be initiated. Articles or commodities to be weighed by manual combinatorial weighing apparatus vary in shape, stickiness, and other properties. For weighing soft elongate articles, such as fish, it is customary for the operator to manually hold the articles, place part of the articles on the scale plate, move them slowly toward the center of the scale plate, and finally release them. Where an article to be weighed is sticky, it takes a considerable time before the sticky article falling by gravity from article feeders on to scale plates is fully distributed and put on the scale plates. In this case, the manual combinatorial weighing apparatus effects combinatorial weighing operation several times while the article is not yet put to prescribed quantities on the scale plates. Therefore, as shown in FIG., 1 of the accompanying drawings, the weight data produced by the weight units tend to vary; they first reach a temporary stable weight value X, and then increase until they reach a true stable weight value Y. If the process for finding a suitable weight combination were effected at the stable point X, then a proper weight combination could not be selected, but an erroneous weight might be selected.

Another problem with the combination combinatorial weighing apparatus is that when the apparatus is in use for a long period of time, the zero point may be shifted due to a temperature-dependent drift or a dust deposit. If the zero point is shifted in a direction to increase the detected weights, those weighing units which do not carry any articles take part in a combinatorial weighing process. When this happens, packages with incorrect weights are produced, and the indicator lamps associated with empty scale plates that are selected remain energized. Where the manual combinatorial weighing apparatus has a target weight of 500 g, an upper limit weight of 504 g, and a lower limit weight of 498 g, if no proper weight combination is obtained and weighing units A, B, C are selected as giving a combination weight of 516 g stored in a processing unit, an error or deviation displayed is $(516-500)=16$ g, and the operator must replace the articles on the weighing units so that the displayed error will fall within a range of from $-2$ g to $+4$ g. It would be quite difficult for the error to fall in that range by replacing the articles only once, and the operator must usually replace the articles several times. Therefore, the efficiency is poor.

SUMMARY OF THE INVENTION

In view of the aforesaid drawbacks of the conventional manual combinatorial weighing apparatus, it is an object of the present invention to provide a manual combinatorial weighing apparatus comprising a plurality of weighing units divided into a plurality of weighing unit sets which are stored in respective casings, the casings being appropriately combined to increase the freedom of using an installation space in a plant, the manual combinatorial weighing apparatus being capable of effecting a weighing operation quickly, reliably, and easily, and of properly energizing indicator lamps for indicating a combination of selected weighing units.

According to the present invention, a manual combinatorial weighing apparatus has a pluraltiy of weighing devices for measuring the weights of articles which are manually placed thereon. The weighing devices are divided into groups which are housed in a plurality of casings. Indicators are mounted on the casings in association with the weighing devices for indicating those weighing devices which are selected as giving an optimum weight combination. A control unit includes means for setting a target weight, means for storing the weight data items from the weighing devices, and control means for effecting a combinatorial weighing process based on the weight data items to select the weighing devices which are selected as giving an optimum weight combination within an allowable error from the target weight. The control unit also includes hold means for holding the indicators energized when a hold key is operated or when the articles are removed from those weighing devices which are selected as giving the optimum weight combination, and control means for detecting when the weight data items from the weighing devices are cleared to zero or a negative value to de-energize the indicators.

The indicators may be held energized over a prescribed period of time.

After the weighing devices are selected as giving the optimum weight combination in a first combinatorial calculation process, the weight data items from the weighing devices may be combined again to effect a second combinatorial calculation process. If the combined weight obtained by the second combinatorial calculation process is closer to the target weight than that of the first combinatorial calculation process, then the indication of the indicators may be corrected by control means of the control unit.

The weight data items from the weighing devices are checked. If they are smaller than a certain value, it is determined that no articles are placed on the scale plates thereof, and these weight data items are not combined in a combinatorial calculation process.

The control unit may include control means for determining, when no weight combination is obtained within a prescribed range, whether or not a weight combination outside of and closer to the prescribed range is to be indicated or not.

With the present invention, since the weighing devices are divided into groups housed in the casings, the weighing devices can be laid out with greater freedom, and can be leveled in a simple process. When articles are removed from the selected weighing devices, the indicators thereof are held energized. The indicators are automatically de-energized when all articles are taken off the selected weighing devices. The efficiency of operation is increased since the operator can know exactly when new articles can be placed on the selected weighing devices.

The manual combinatorial weighing apparatus of the invention is composed of samll-size weighing devices with no drive mechanisms. Therefore, the manual combinatorial weighing apparatus can be installed in a small space, and can be used for weighing articles that can easily be damaged and also can be used for weighing a small quantity of articles.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 2A:
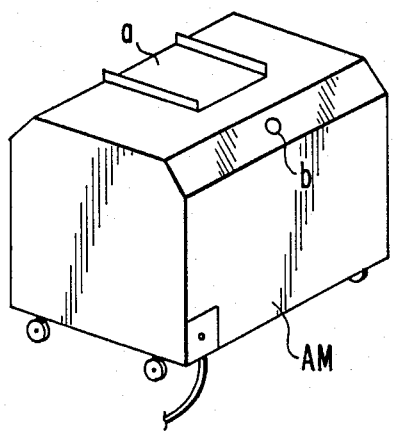
FIGS. 2(a) through 2(c) are perspective views of components of a manual combinatorial weighing apparatus according to the present invention.
Figure 2B:
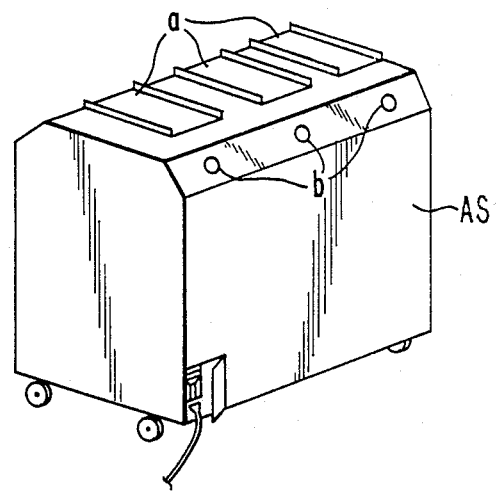
Figure 2C:
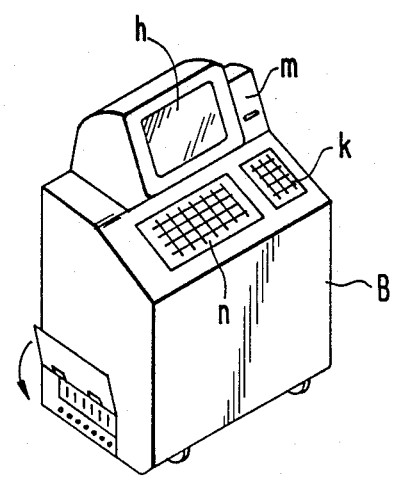

FIGS. 2(a) through 2(c) show in perspective components of a manual combinatorial weighing apparatus according to the present invention. FIG. 2(a) illustrates a basic weighing unit AM comprising a single scale plate a, a weighing device (not shown) coupled to the scale plate a, and a pair of selection indicator lamps b disposed one on each side of the scale plate a.

As shown in FIG. 2(b), a weighing unit AS has a plurality of, for example three, scale plates a, a weighing device coupled thereto, and three pairs of indicator lamps b.

FIG. 2(c) shows a control unit B housing a control CPU for executing a combinatorial processing operation on weights measured by the weighing units, comparing the weight combinations with a target weight stored in a memory, and generating an energizing signal to be applied to those indicator lamps b associated with the weighing units selected as giving an optimum weight combination. The control unit B has an input key pad N for entering necessary information, a display unit h for displaying weight combinations, a ten-key pad K for setting addresses of the scale plates a, and a printer for printing dates and weights on labels applied to packages of articles which have been weighed and packed.

The weighing units AM, AS and the control unit B are interconnected by signal lines for transferring weight signals to the control unit B and signal lines for transmitting control signals from the control unit B to energize the indicator lamps b as described later.

Two operators are located on opposite sides of the weighing units AM, AS in confronting relation to the scale plates a. One of the operators places articles on the scale plates a, whereas the other operator removes the articles from the scale plates a and packages them.

Figure 3:
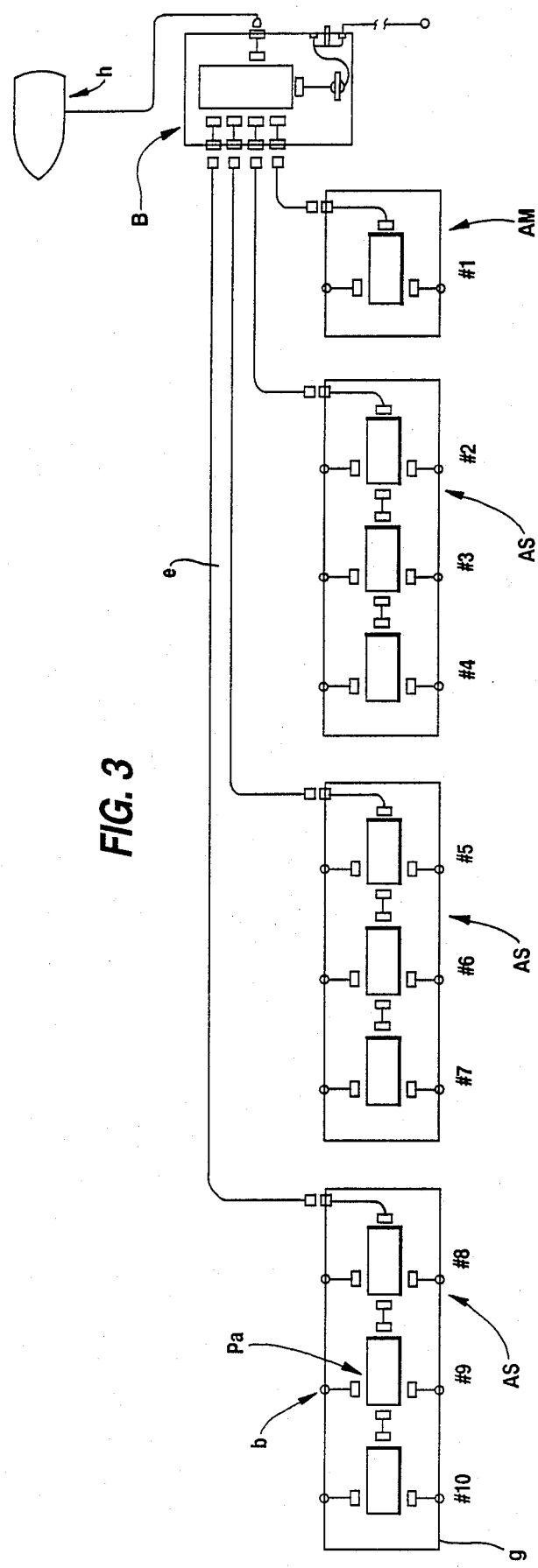
FIG. 3 is a block diagram of the manual combinatorial weighing apparatus according to the present invention.

FIG. 3 schematically shows in block form the manual combinatorial weighing apparatus of the invention. In the illustrated embodiment, the manual combinatorial weighing apparatus comprises ten weighing devices #1 through #10. The weighing devices #2 through #10 are divided into three groups which are stored in casings g of three weighing units AS, respectively. The weighing device #1 is singly stored in the casing of the weighing unit AM. Weighing device baseboards PA support thereon A/D converters, interfaces, and other circuit components for the respective weighing devices. Weight data obtained from each of the weighing devices is transmitted through a signal line (bus line) e to the control unit B. The control CPU in the control unit B can always monitor the weight date from each weighing device by way of polling. Denoted at h is a display unit.

The manual combinatorial weighing apparatus of the present invention is constructed as shown in FIGS. 2 and 3. The operators are situated on opposite sides of the weighing devices. One operator puts articles to be weighed on the weighing devices, and the other operator removes the articles from those weighing devices which have been selected as having an optimum weight combination, packags the remove articles.

The weighing devices are stored in the casings in groups of 3:3:3:1, because if the weighing devices were stored in a single casing, they would not easily be carried around and the layout of the weighing devices would be subjected to limitations, and also because if the weighing devices were stored in respective casings, it would be complex to level the weighing devices. One main scale, here the weighing device #1, is forced to take part in a combinatorial weighing operation, as when mixing two types of articles and packing them into on package. Any one or more of the other weighing devices may be selected as a main scale. The main scale or scales which are forced to take part in a combinatorial weighing operation are located so that they can be operated by the operator most easily. Where articles to be weighed do not need such forced participation of the main scale, the main scale may be dispensed with, and all of the weighing devices may be ordinary weighing devices.

Figure 4A:
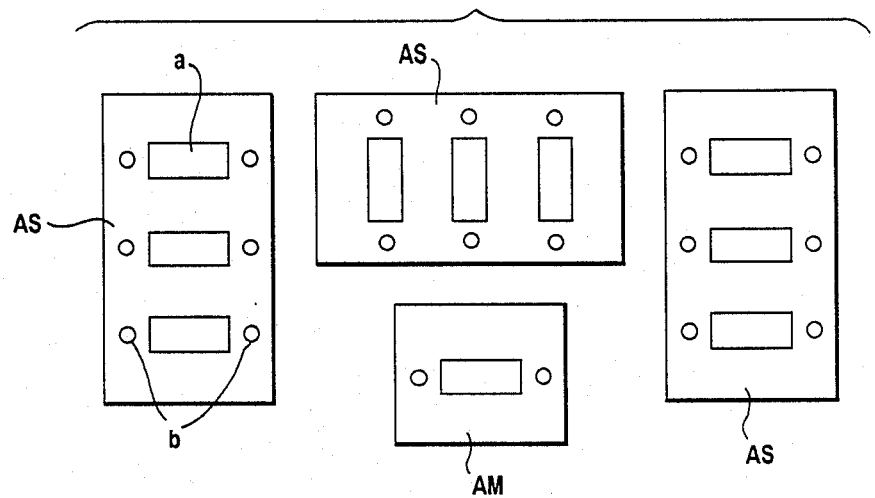
FIGS. 4(a) and 4(b) are views showing the layouts of weighing units of the invention.
Figure 4B:
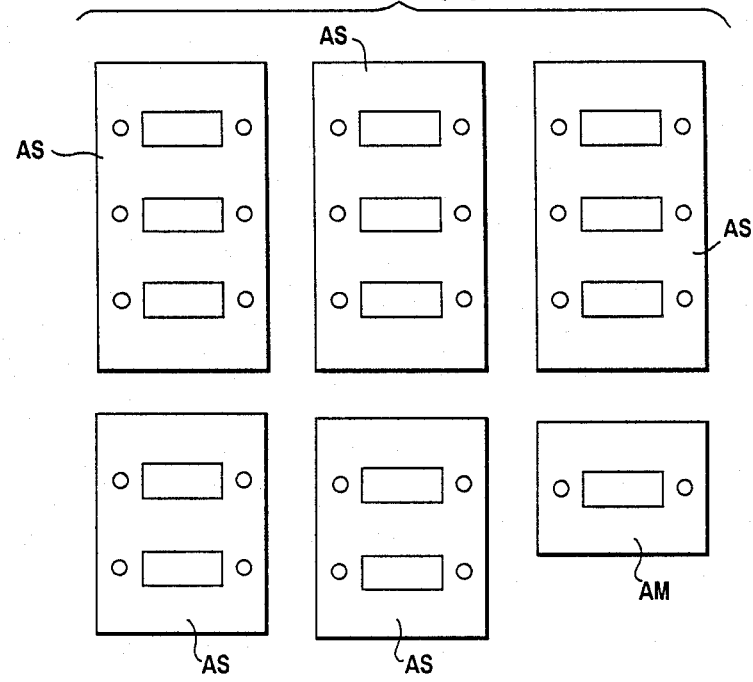

FIGS. 4(a) and 4(b) are illustrative of the layouts of weghing units of the invention. FIG. 4(a) shows a manual combinatorial weighing apparatus comprising three weighing units AS each having three scale plates a, weighing devices coupled respectively thereto, and three pairs of indicator lamps b, and one weighing unit AM comprising a scale plate a, a weighing device coupled thereto, and a pair of indicator lamps b. Thus, the manual combinatorial weighing apparatus has a total of ten scale plates a.

FIG. 4(b) illustrates a manual combinatorial weighing apparatus comprising three weighing units AS each having three scale plates a, weighing devices coupled respectively thereto, and three pairs of indicator lamps b, and one weighing unit AM comprising a scale plate a, two weighing units AS each having two scale plates a, weighing devices coupled respectively thereto, and two pairs of indicator lamps b, and one weighing unit AM comprising a scale plate a, and a weighing device coupled thereto, and a pair of indicator lamps b. Thus, the manual combinatorial weighing apparatus has a total of fourteen scale plates a.

With the present invention, therefore, there are a plurality of weighing units each having one or more sets of a scale plate, a weighing device coupled thereto, and a pair of indicator lamps. In view of the installation space available in a plant or a desired degree of weighing accuracy, the number of required scale plates and hence the number of weighing units used are determined, and the weighing units are laid out freely dependent on the positions where operators are located. As a result, the manual combinatorial weighing apparatus can be used with increased freedom or with less limitations.

Figure 5A:
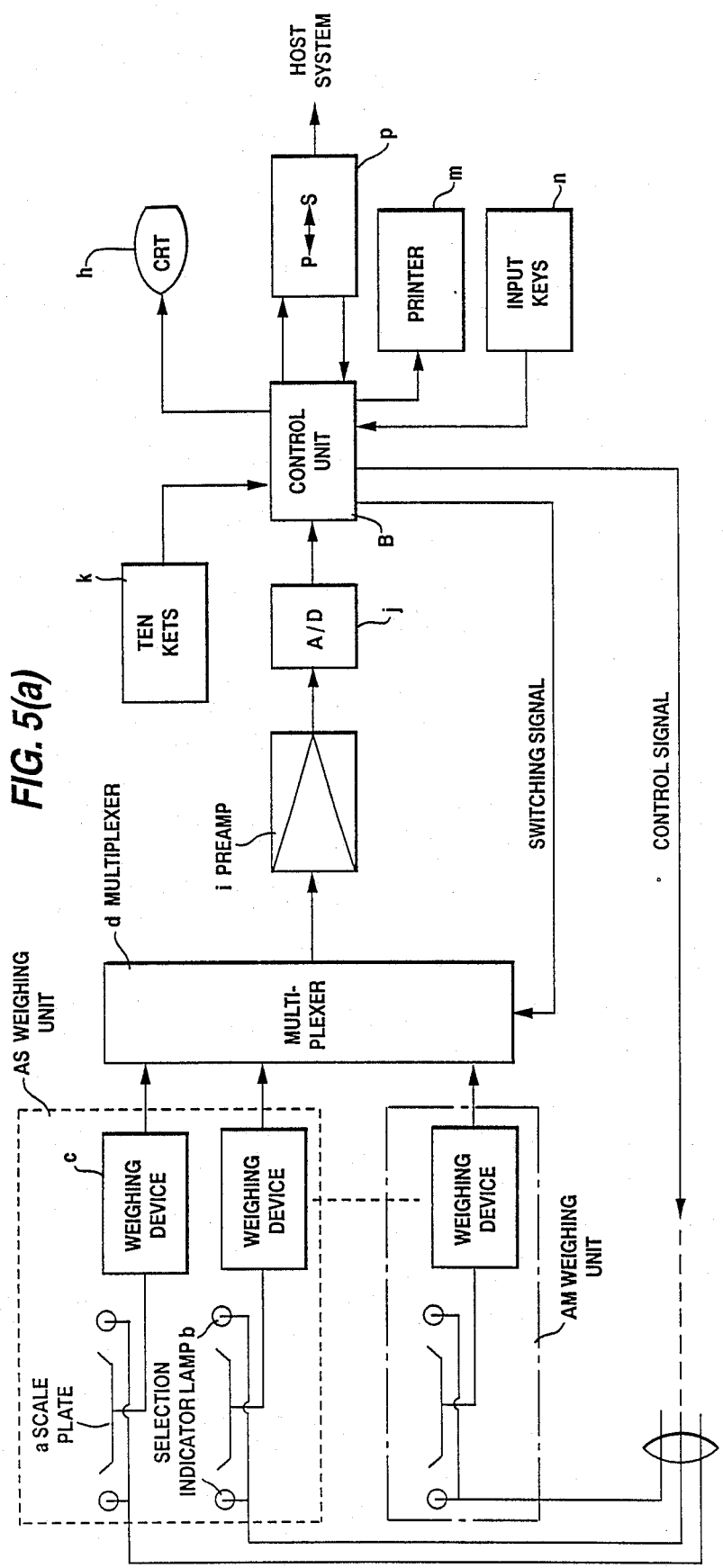
FIGS. 5(a) and 5(b) are block diagrams of electric circuits of the present invention.
Figure 5B:
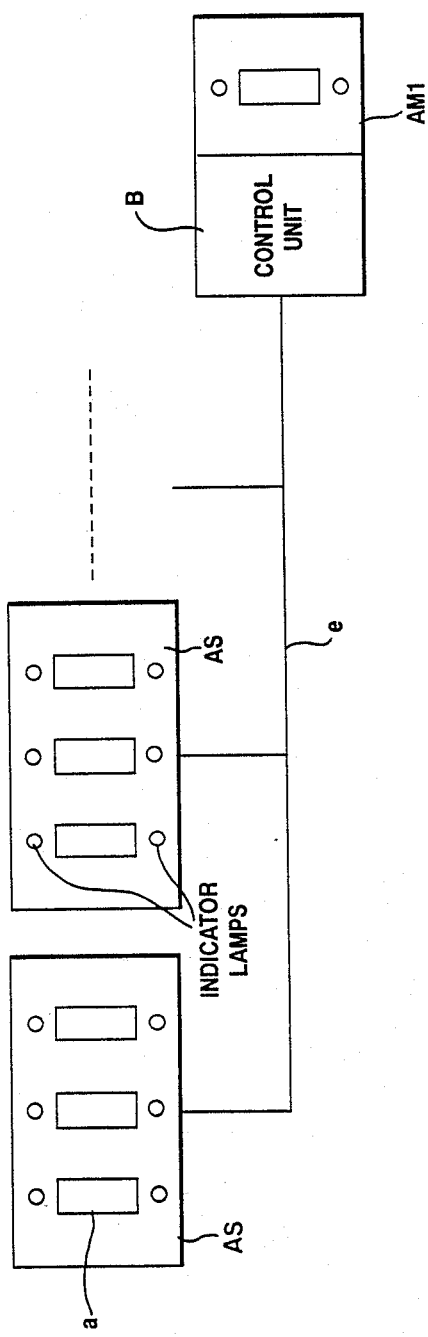

FIGS. 5(a) and 5(b) are block diagrams of electric circuits that can be employed by the manual combinatorial weighing apparatus according to the present invention. The weighing units AS, AM have scale plates a, weighing devices c coupled thereto and comprising load cells or the like and indicator lamps b. Weight data obtained by each weighing device c is applied to a multiplexer d. In response to a switching signal from the control unit B including a CPU and a memory, the multiplexer d successively reads the weight data items from the weighing devices c and applies digital values of the weight data items to the control unit B through a preamplifier i and an A/D converter j. As described with reference to FIG. 2(c), the control unit B has the display unit (CRT) h, the ten-key pad k, the printer m, and the input key pad n. The control unit B is connected through a parallel-to-serial converter p to a host system (not shown) which analyzes the transmitted data.

In FIG. 5(a), the weighing units and the control unit are separate from each other. However, the control unit may be mounted on any one of the weighing units, and may be shared by the weighing units. FIG. 5(b) shows such an arrangement in block form. In FIG. 5(b), a number of weighing units AS are connected through a signal line e to a weighing unit AM1 where the control unit B is incorporated. The control unit B operates in the same way as the control unit B shown in FIG. 5(a).

Each of the indicator lamps b for indicating participation in a selected weight combination comprises an LED which should be held energized when the articles start being removed after they have been weighed. This is because if the indicator lamp -b associated with a weighing device that has taken part in the selected weight combination were de-energized, the operator might put new articles additionally on the scale plate, and another combinatorial weighing process would be carried out, thus altering the displayed combined weight. According to the present invention, the indicator lamp b automatically or manually starts being held energized, and then removed of all articles from the scale plate a is automatically detected to automatically de-energize the indicator lamp b in preparation for a next combinatorial weighing cycle.

Figure 6:
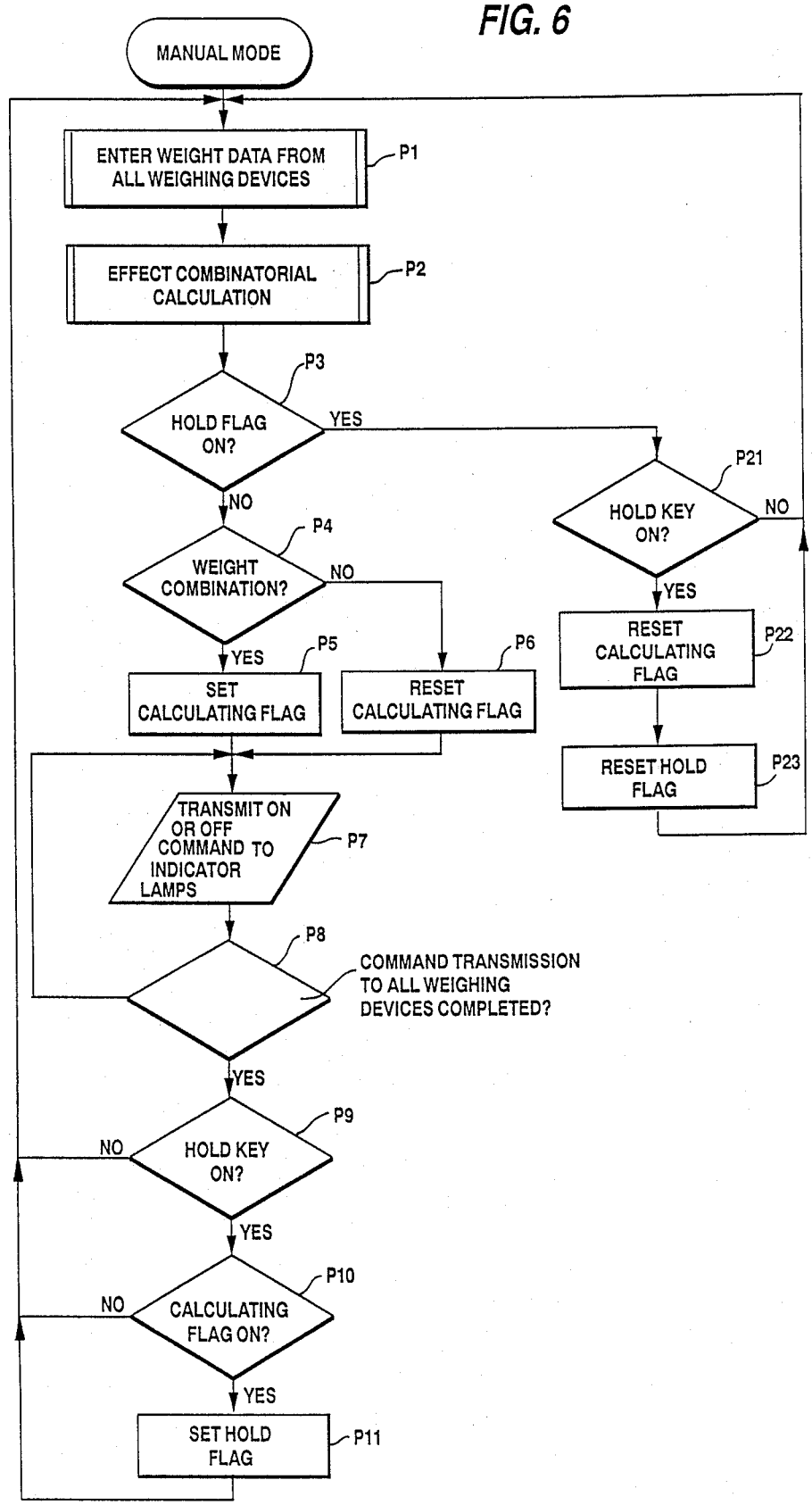
FIG. 6 is a flowchart of a basic processing sequence for a manual mode to hold an indicator lamp energized.

FIG. 6 shows a basic manual processing sequence for holding the indicator lamp b energized. A process of holding the indicator lamp b energized will now be described with reference to FIG. 6.

(1) A manual mode is selected by a key of the input key pad n of the control unit B. After it is confirmed that weight data items have entered from all of the weighing devices in a step P1, a combinatorial calculation process is carried out in a step P2. Then, a hold flag for the indicator lamp b is checked in a step P3. If the hold flag is not ON, then a step P4 checks whether there is a weight combination or not. If there is a weight combination, then a calculating flag is set in a step P5, and if there is no weight combination, then a calculating flag is reset in a step P6.

(2) An ON or OFF command for the indicator lamp b is transmitted in a step P7, and completion of the transmission of ON or OFF commands for all of the weighing devices is confirmed in a step P8. If a hold key for the indicator lamp b is ON in a step P9, a step P10 checks whether the calculating flag is ON or not. If the calculating flag is ON, the hold flag is set in a step P11, and control goes back to the step P1. If the hold key is OFF in the step P9, control returns from the step P9 to the step P1 for a next weighing process.

(3) If the hold flag is ON in the step P3, the calculating flag is reset in a step P22 when the hold key is ON in a step P21, and then the hold flag is reset in a step P23.

The operator can ascertain whether the apparatus is in a combinatorial calculation process or not by utilizing operation of the hold key to start and stop holding the indicator lamp energized and also by utilizing the hold flag. The present invention is characterized in that operation of the hold key to stop holding the indicator lamp energized is eliminated.

Figure 7:
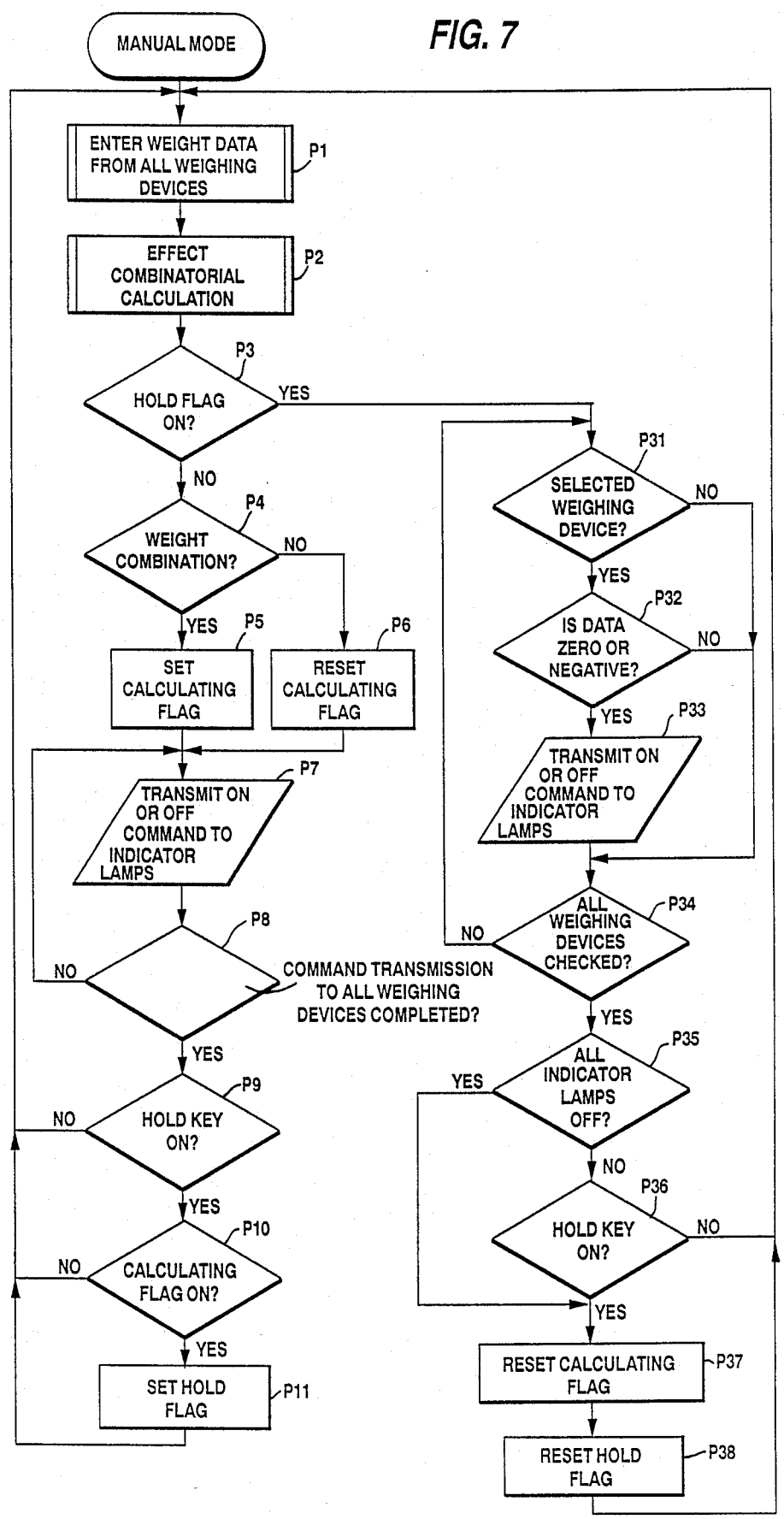
FIG. 7 is a flowchart of a manual processing sequence for another manual mode.

FIG. 7 shows a flowchart of another basic manual processing sequence for holding the indicator lamp b energized. The flowchart of FIG. 7 includes steps P1 through P11 which are the same as those of FIG. 6. Therefore, only the other steps different from those of FIG. 6 will be described below.

(1) If the hold flag is ON in the step P3, a step P31 ascertains whether the weighing device is selected as giving a desired weight combination. If yes, a step P32 confirms that the weight data is cleared to zero or a negative value, i.,e., that all of the articles have been taken away from the scale plate, and a command for turning off the indicator lamp b is transmitted in a step P33. The process of the steps P31 through P33 is effected for all of the weighing devices in a step P34.

(2) Then, a step P35 checks if the indicator lamps b of all of the weighing devices are turned off. If not, a step P36 checks if the hold key is ON or not. Then, the calculating flag is reset in a step P37, and the hold flag is reset in a step P38. If any of the indicator lamps b is energized in the step P35 and the hold key is not ON in the step P36, then control goes back to the step P1 to continue the weighing process.

Figure 8:
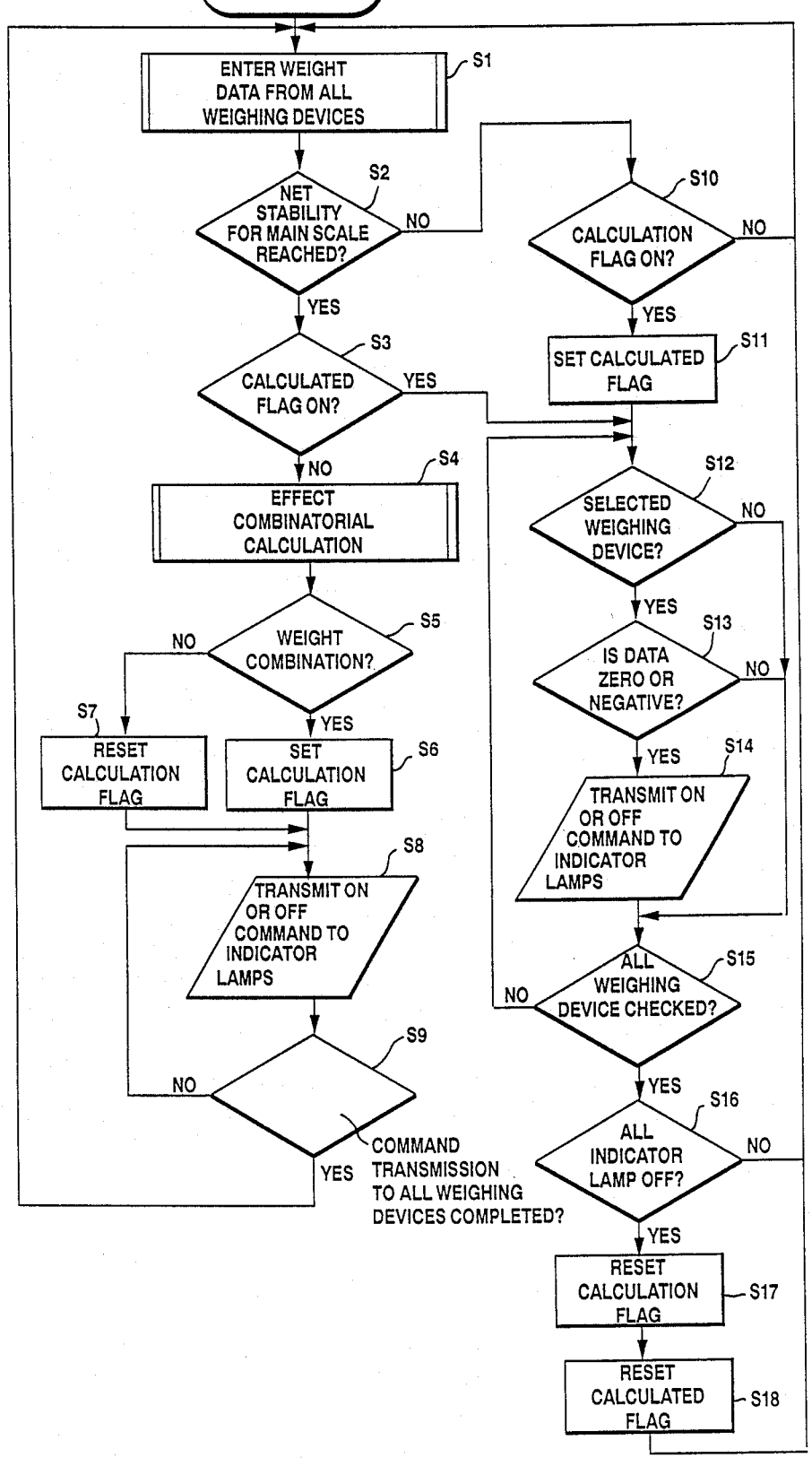
FIG. 8 is a flowchart of a processing sequence for triggering an automatic mode to hold an indicator lamp energized with a main scale when the main scale is forced to take part in combinatorial weighing operation.

FIG. 8 is a flowchart of a processing sequence for triggering an automatic mode to hold an indicator lmap energized with a main scale when the main scale is forced to take part in combinatorial weighing operation. Operation to hold the indicator lamp energized will be described with reference to the flowchart of FIG. 8.

(1) After the weight data items have entered from all weighing devices in a step S1, a step S2 confirms that articles are placed on the main scale and the weight of the articles is stable (net stability) based on the weight data from the main scale, and a step S3 checks if a weighed flag is ON or not. If not, a combinatorial calculation process is carried out in a step S4. Then, a step S5 checks whether there is a weight combination or not. If there is a weight combination, then a calculating flag is set in a step S6, and if there is no weight combination, then a calculating flag is reset in a step S7. An ON or OFF command for the indicator lamp b is transmitted in a step S8, and upon completion of the transmission of ON or OFF commands for all of the weighing devices in a step S9, control goes back to the step S1.

(2) If net stability of the main scale is not confirmed in the step S2, i.e., if the articles are removed from the scale plate after the combinatorial weighing process, a step S10 checks if a calculating flag is ON or not. If yes, then a calculated flag is set in a step S11. Then, a step S12 checks if the weighing device is selected, and a step S13 confirms that the data is zero or negative, i.e., the articles have been removed from the scale plate, followed by a step S14 in which an OFF command for the indicator lamp b is transmitted.

(3) The steps S12 through S14 are repeated in a step S15 until all of the weighing devices are checked. After all of the weighing devices are checked, a step S16 confirms that the articles have been taken off all of the weighing devices which have been selected in the weight combination. Then, the calculating flag is reset in a step S17, and the calculated flag is reset in a step S18.

In the above embodiment, the combinatorial calculation process and indications are effected only when the main scale shows a positive weight, not zero, and is stable. Therefore, the automatic mode for holding the indicator lamps energized is achieved. This process is summarized as follows:

(a) First, articles are placed on the main scale.

(b) Articles are placed on subscales.

(c) When weighing devices which give a prescribed weight combination are selected by a combinatorial calculation process that is carried out each time weights are entered, the indicator lamps b of the selected weighing devices are energized.

(d) When the articles start being taken off the main scale, the indications of the indicator lamps b are prevented from being altered. That is, the indicator lamps b are held energized, and no combinatorial calculation process is effected even if weight data is entered.

(e) The indicator lamps b of the selected weighing devices are successively de-energized when the articles are removed from the scale plates and the weight data items are cleared to zero. When all of the indicator lamps are de-energized and next articles are put on the main scale, a combinatorial calculation process is started again.

When the main scale is forced to take part in a combinatorial weighing operation, any subsequent process is not performed unless articles are placed on the main scale. Accordingly, articles will not be left on the scale plates due to an oversight. Since the automatic mode for holding the indicator lamps energized is triggered by the main scale, the conditions of operation are easier to recognize.

Figure 9:
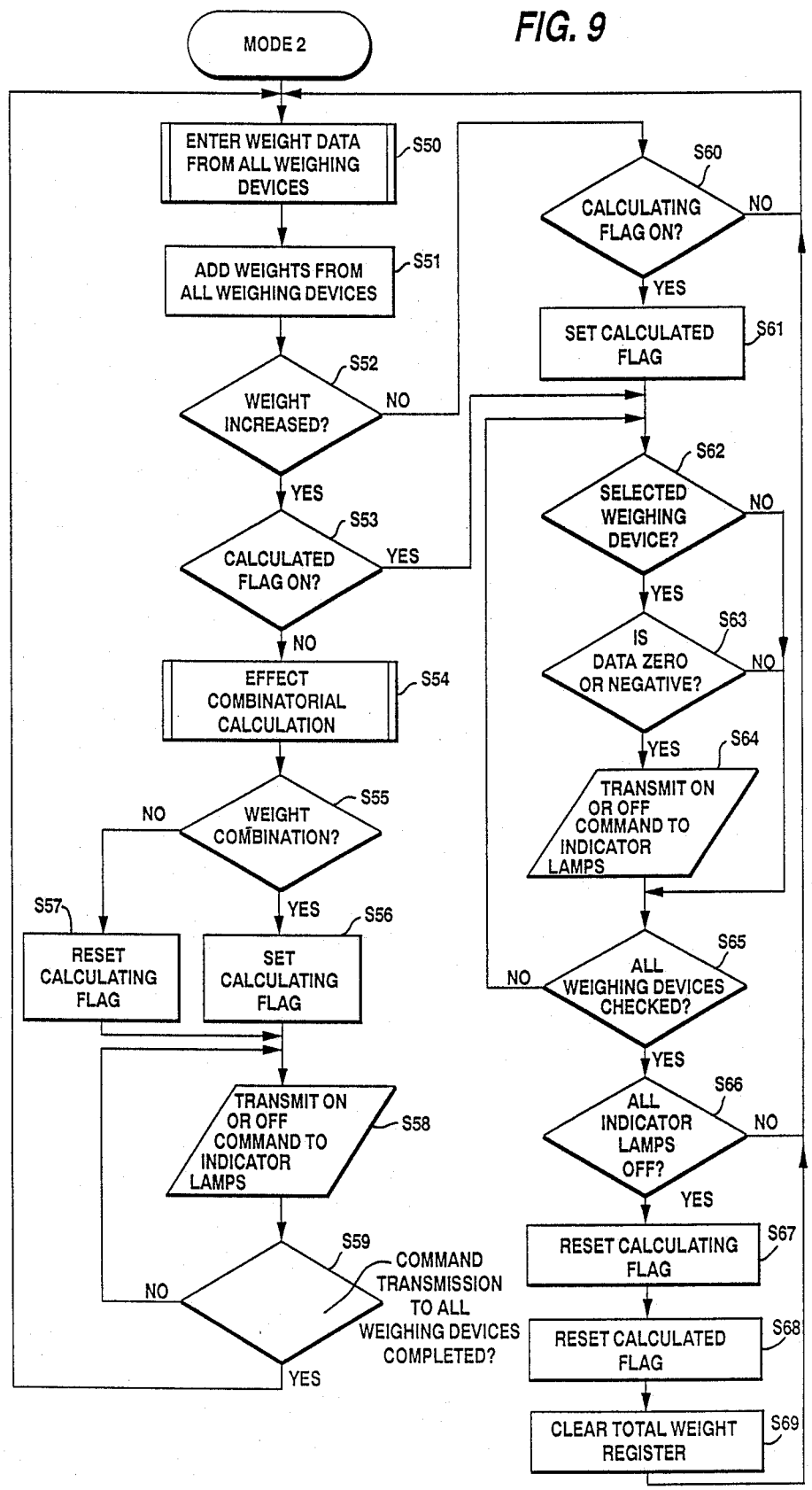
FIG. 9 is a flowchart of another processing sequence for another automatic mode.

FIG. 9 is a flowchart of another automatic mode for holding the indicator lamps energized. This automatic indication holding mode will be described below.

In this mode, while the total weight of the weighing devices is increasing, it is determined that the apparatus is in combinatorial weighing operation. When the total weight starts being reduced, it is judged that the articles begin to be removed from the weighing devices. The automatic indication holding mode is controlled on the basis of the above judgement. Any one of the weighing devices is operable to trigger the automatic holding mode, and no weighing device is required to be forced to take part in the combinatorial weighing operation. Only those steps of FIG. 9 which are different from those of FIG. 8 will be describe below.

First, weight data items from all of the weighing devices are entered in a step S50, and added in a step S51. A step S52 checks if the total weight increases or not. If the weight increases, then steps S53 through S59 which are the same as the steps S3 through S9 in FIG. 8 are executed to effect a combinatorial calculation process. If the weight is not increased in the step S52, then control goes to a step S60. The step S60 and following steps S68 are the same as the steps S10 through S18 in FIG. 8. After confirming that all of the indicator lamps b have been turned off, i.e., the articles have been removed from all of the weighing devices, the calculating flag and the calculated flag are reset. Thereafter, a register storing the total weight is cleared in a step S69, and control goes back to the first step S50.

According to the above embodiment, the manual combinatorial weighing apparatus selects those weighing devices which give an optimum weight combination within a prescribed allowable error with respect to a target weight. Now, a manual combinatorial weighing/counting apparatus for selecting weighing devices that give an optimum combination with respect to a target weight and a target count according to another embodiment will be described below. In this embodiment, the manual combinatorial weighing apparatus of the type described above is combined with count data storage means for setting a number or count of weighing devices to be selected for an optimum combination and for storing the set count.

First, a combination of weighing devices including the set number or count of weighing devices is employed to effect a combinatorial weight calculation process, and those weighing devices among the combination which give an optimum weight combination within a prescribed allowable error from a targe weight are selected. Therefore, by placing one article on each weighing device, a combination of articles having an optimum weight and a preset number or count is attained from the same number of weighing devices.

Another manual combinatorial weighing apparatus for selecting weighing devices which provide an optimum combination with respect to a target weight by combining weight data items of a plurality of types of articles will be described. For example, two types of articles A, B are to be processed, and a target weight for mixed articles A, B is preset. The weighing devices used are classified into two groups for the articles A, B, respectively, and the articles A, B are placed on the weighing devices in these two groups. The manual combinatorial weighing apparatus has two weight data storage means for storing weight data obtained by weighing the articles A, B with the weighing devices.

A combination of weighing devices, including at least one of the weighing devices in the group for the articles A and at least one of the weighing devices in the group for the articles B, i.e., a combination of weight data items including at least one weight data item from one of the weight data storage means and at least one weight data item from the other weight data storage means, is employed to effect a combinatorial weight calculation process, and those weighing devices which give an optimum weight combination within a prescribed allowable error from a target weight are selected. By providing count data storage means for the respective article types A, B and storing the counts of weighing devices for the respective article types A, B, which are selected as giving an optimum combination, e.g., two weighing devices for the article type A and three weighing devices for the article type B, the optimum combination can be selected from among combinations including the total of five weighing devices.

Though two types A, B of articles have been described by way of example, any number of types of articles can be processed according to the this embodiment.

An example of counting and weighing a prescribed count of articles having a prescribed weight will be described below. To make a 300-g package of three fish, the operator places fish one by one on weighing devices. The control unit effects a combinatorial calculation process according to a combination pattern including three weighing devices. Those weighing devices which give a combination having a weight of 300 g or close thereto within an allowable range are selected, and the indicator lamps of the selected weighing devices are energized. If no desired weight combination is obtained, the operator appropriately replaces some of the fish with new fish until the desired weight combination is reached.

The weighing apparatus of the present invention can also weigh a mixture of plural types of fish, such as horse-mackerel and mackerel pike, up to 600 g and packages the fish in a selected combination. In this case, fourteen weighing devices, for example, are employed with one weighing device thereof being used as a main scale which is forced to take part in combinatorial weighing operation. The other thirteen weighing devices are divided into groups and stored in casings. The main scale is used to weigh horse-mackerels, and mackerel pikes are placed respectively on the other weighing devices. Those weighing devices which give a total weight of 600 g for a mixture of horse-mackerels and mackerel pikes are selected, and the indicator lamps of the selected weighing devices are energized.

In the embodiments described with reference to FIGS. 2 through 9, since weighing devices are stored as groups in casings, the weighing devices can be laid out with greater freedom, and can easily be leveled. After a combinatorial weighing process is completed, the indicator lamps b of the selected weighing devices are automatically or manually energized. The articles are removed successively from the selected weighing devices until the weight data items from the weighing devices are cleared to zero or a negative value, indicating that all of the articles have been removed from the selected weighing devices, whereupon the indicator lamps b are successively de-energized automatically. Since new articles can be placed on those weighing devices with the indicator lamps b de-energized even if the articles are not yet removed from all of the selected weighing devices, the efficiency of operation is increased. The control process is facilitated because the indicator lamps b are automatically de-energized. The manual combinatorial weighing apparatus has small-size weighing devices with no drive mechanisms, so that the installtion space required by the apparatus may be small, and the apparatus can be used to weigh a small quantity of articles or articles which can easily be damaged. The manual combinatorial weighing apparatus can therefore be used in a wider range of applications.

The manual combinatorial weighing apparatus of the invention is arranged such that each indicator lamp is de-energized when the weight of remaining articles on the scale plate reaches a preset value near zero, e.g., 5 g, so that a next process can be effected even when small remains are left on the scale plate. The range of allowable remains on the scale plate, in which the indicator lamp can be de-energized, can be set by the input key pad n. This range is made variable and can be set to any value dependent on the type of articles to be weighed. For example, the higher the unit price, the smaller the range may be to reduce any loss that could happen during the weighing process. The lower the unit price, the greater the range may be to speed up the weighing process.

Figure 10:
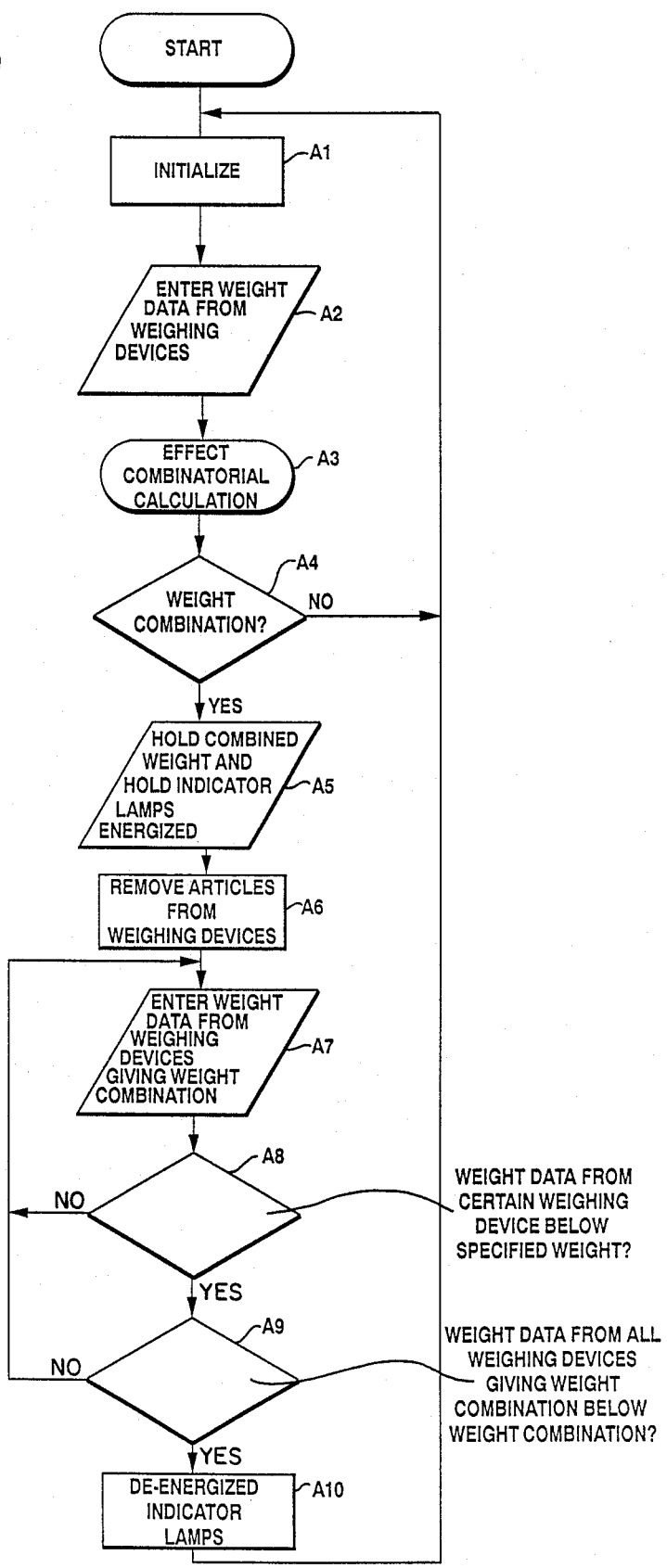
FIG. 10 is a flowchart of a processing sequence according to another embodiment of the present invention.

FIG. 10 is a flowchart of a processing sequence of the above operation involving the allowable range for remains to be left on the scale plate.

(1) In a step A1, initialization is effected as by establishing a weight setting for de-energizing the indicator lamps. Weight data items are entered from all weighing devices, e.g., ten weighing devices in a step A2. Then, a combinatorial calculation process is executed in a step A3, followed by a step A4 which checks whether an optimum weight combination with respect to a targe weight is reached or not. If not, the steps A1 through A4 are repeated until such an optimum weight combination is attained.

(2) If an optimum weight combination is achieved, the combined weight is held and the indicator lamps of the weighing devices giving that weight combination are held energized in a step A5, and the articles are removed from those weighing devices in a step A6.

(3) The weight data items are entered from the weighing devices which have took part in the weight combination in a step A7. A step A8 then checks whether the input weight data from a certain weighing device is below a specified weight. If not, the operator removes from the certain weighing device, and then the steps A7, A8 are executed again. If the input weight data from the weighing device drops below the specified weight, then a step A9 successively checks whether the weight data items from the weighing devices which have participated in the weight combination are below the specified weight. If yes, then the indicator lamps are de-energized.

The specified weight below which the indicator lamps are de-energized can be selected as desired dependent on the articles to be weighed through an input device such as the ten keys. For example, for articles of a higher unit price, the specified weight may be made smaller for higher accuracy, and for articles of a lower unit price, the specified weight may be made greater for increased speed of operation.

In the embodiment of FIG. 10, as described above, the indicator lamps which have been energized of those weighing devices that give an optimum weight combination with respect to a target weight can be de-energized on the condition that the weight data from each of the weighing devices drops below a preset weight near zero. Therefore, the problem of continuously holding the indicator lamps energized because of small remains on the scale plates, thus failing to perform any subsequent process, can be eliminated, and the weighing operation can efficiently be carried out.

Figure 1:
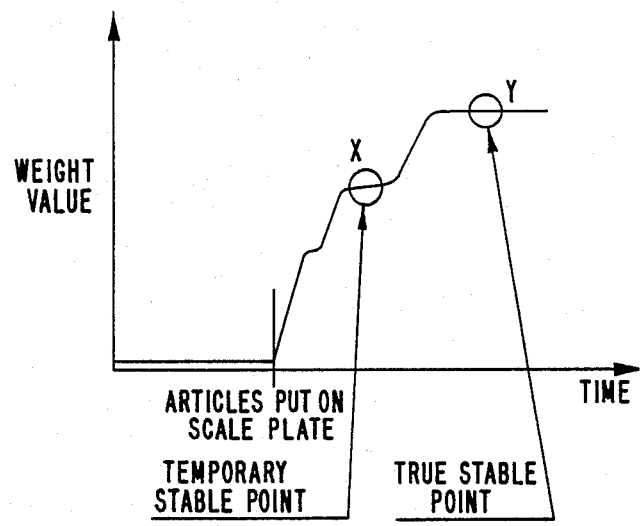
FIG. 1 is a graph showing time-dependent changes of weight data produced when articles are placed on a scale plate of a manual combinatorial weighing apparatus.

According to the present invention, after weighing devices giving an optimum weight combination have been selected through a combinatorial calculation process, a combinatorial calculation process is effected again to prevent weighing devices from being selected which provide a wrong weight combination due to a combinatorial calculation process effected at the temporary stable point X in FIG. 1. This operation is indicated by flowcharts of FIGS. 11 and 12.

Figure 11:
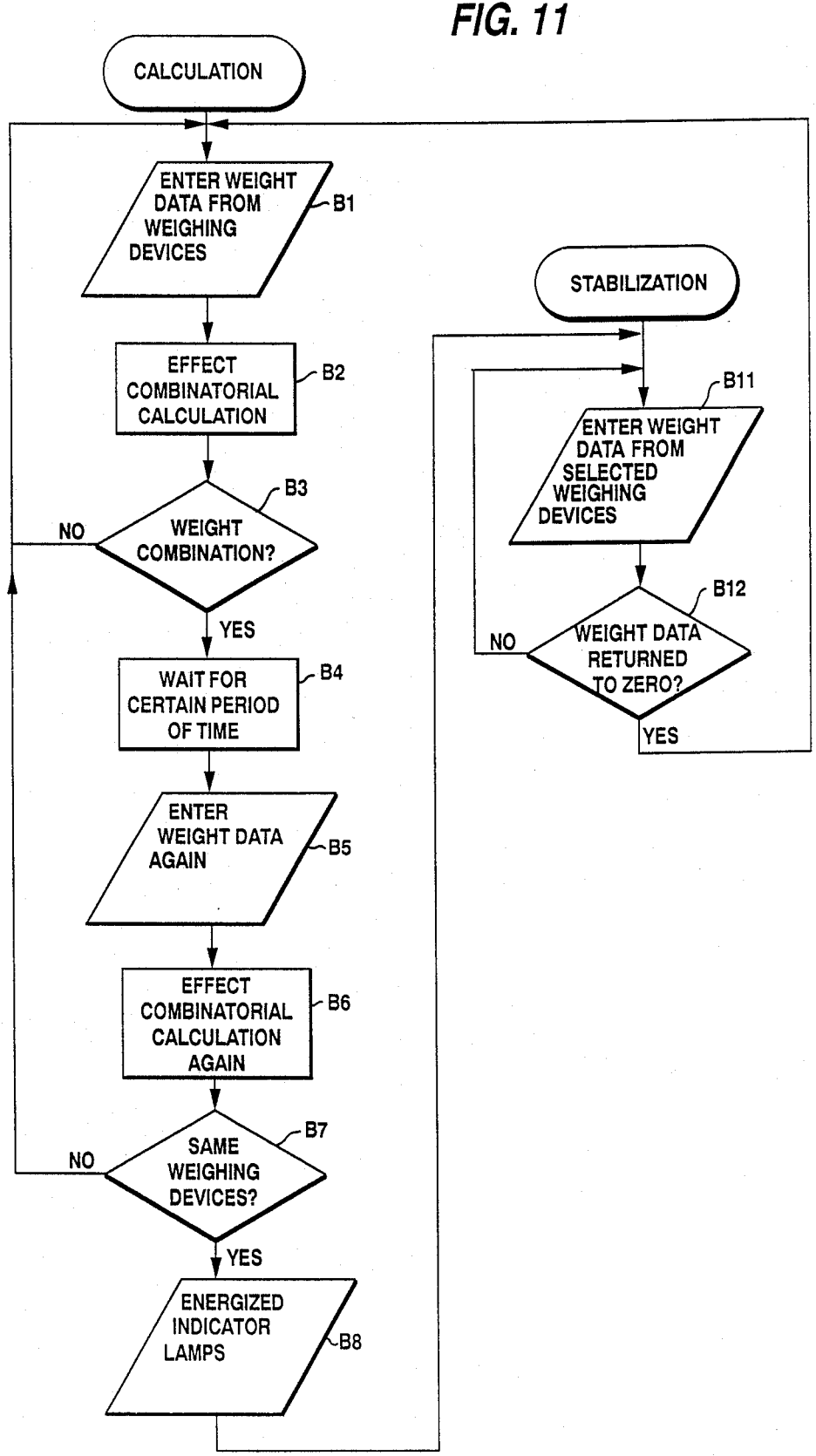
FIG. 11 is a flowchart of a first operation sequence according to still another embodiment of the prsent invention.

FIG. 11 is a flowchart of a first operation sequence of such a combinatorial weighing operation.

(1) Weight data items are entered from all weighing devices, e.g., ten weighing devices in a step B1. Then, a combinatorial calculation process is executed in a step B2, followed by a step B3 which checks whether there are weighing devices giving an optimum weight combination with respect to a targe weight. If not, the steps B1 through B3 are repeated until such an optimum weight combination is attained. If the optimum weight combination is achieved, a preset time period, i.e., 1 second, is allowed to elapse in a step B4, and the weight data items from the weighing devices are entered again in a step B5. Based on the newly entered weight data items, a combinatorial calculation process is effected again in a step B6, and a step B7 checks whether the same weighing devices as those found in the step B3 are selected as giving an optimum weight combination or not. If not, all of the articles are removed from the weighing devices, and new articles are placed thereon, followed by the process beginning with the step B1. If the same weighing devices are selected, then the indicator lamps thereof are energized in a stp B8.

(2) The operator packages those articles removed from the weighing devices with the energized indicator lamps into a container, and enters the weight data of the selected weighing devices in a step B11. If the weight data of the selected weighing devices do not return to zero in a step B12, control goes back to the step B11. If the weight data return to zero in the step B12, the weight data items are entered in the step B1.

Figure 12:
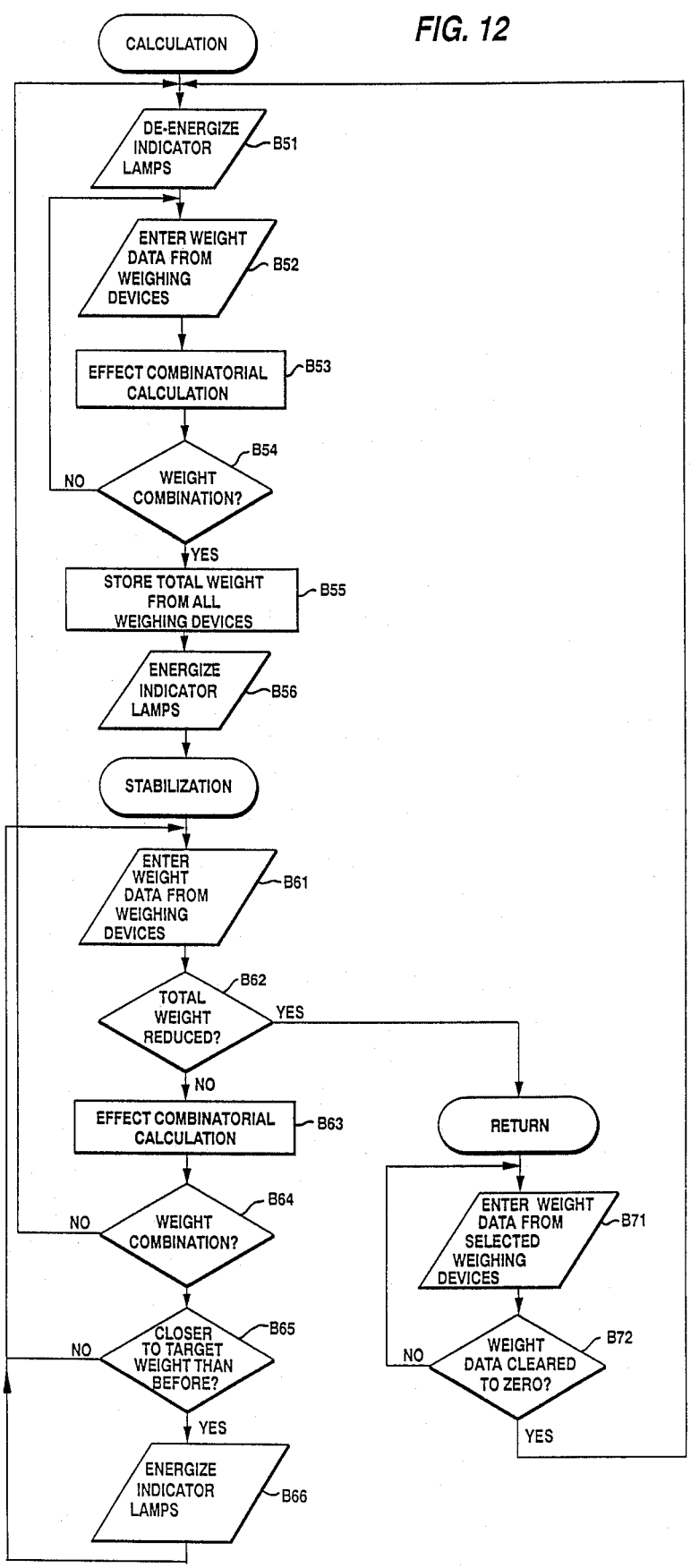
FIG. 12 is a flowchart of a first operation sequence according to yet still another embodiment of the prsent invention.

FIG. 12 is a flowchart of a second operation sequence of such a combinatorial weighing operation.

In the second operation sequence, any time period allowed to elapse is not provided, and a combinatorial calculation process is effected at all times to energize the indicator lamps of those weighing devices which give an optimum weight combination. If indicator lamps which are once energized are de-energized freely in a corrective fashion, the operator may be confused. To avoid this, the energization of indicator lamps of those weighing devices which give a weight combination is corrected when a weight combination closer to a target weight is obtained.

When the total weight of articles on weighing devices at present is reduced from the total weight of articles on all of the weighing devices at the time an optimum weight combination is found, it is determined that the articles start being removed from the selected weighing devices, and hence the indicator lamps of the selected weighing devices ar de-energized.

The flowchart of FIG. 12 will now be described below.

(1) The indicator lamps of all of the weighing devices are de-energized in a step B51, and weight data items from all of the weighing devices, e.g., ten weighing devices, are entered in a step B52. Then, a combinatorial calculation process is executed in a step B53. A step B54 checks whether weighing devices giving an optimum weight combiation with respect to a targe weight are found or not. If not, the steps B52 and B53 are executed again. If an optimum weight combination is reached, the total weight of all of the weighing devices is stored in a step B55, and the indicator lamps of the selected weighing devices are energized in a step B56.

(2) Weight data items are entered from all of the weighing devices in a step B61. Then, a step B62 ascertains whether the total weight is reduced from the total weight at the time the optimum weight combination is found. If not, i.e., the total weight is increased, a combinatorial calaculation process is carried out in a step B63, and a step B64 checks if there is established an optimum weight combination or not. If not, the process beginning with the step B51 is repeated. If yes, then a step B65 checks whether the combined weight is closer to the target weight than the previously combined weight. If not, control returns to the step B61 in which the weight data items from all of the weighing devices are entered. If yes, the indicator lamps are energized in a corrective fashion in a step B66, and then control goes back to the step B61.

(3) If, in the step B62, the total weight is reduced from the total weight at the time the optimum weight combination is found, it is judged that the articles start to be removed from the weighing devices selected as giving the optimum weight combination, and control goes to a return process for de-energizing the indicator lamps. In this process, the weight data items are entered from the selected weighing devices in a step B71, followed by a step B72 which checks whether the weight data items ar cleared to zero or not. If the weight data items are not cleared to zero, then control returns to the step B71, and if the weight data items are cleared to zero, then the indicator lamps of the weighing devices giving the weight combination are de-energized in the step B51.

If, after a weight combination is established, the combined weight is varied between the target weight and an upper limit weight, then the energization of the indicator lamps may not be corrected. If the total weight at present time is more largely varied in excess of the upper limit weight than the total weight of the articles on the selected weighing devices at the time the weight combination is found, then the total weight is determined to be excessive, and the indicator lamps are de-energized. If the weight of the articles on the weighing devices giving a weight combination is varied, the displayed weight may be replaced with a new weight.

In this embodiment, as described above, after an optimum weight combination has been obtained, a combinatorial calculation process is effected again, and if the present combined weight is the same a the preceding combined weight or closer to a target weight than the preceding combined weight, then the indicator lamps of the weighing devices selected to give the optimum weight combination are energized. Therefore, the weight data items are combined at the true stable point without causing an error in the weighing process.

As another embodiment, when the weights of articles are measured by a plurality of weighing devices for effecting a combinatorial calculation process, only those weighing devices which have obtained weights larger than a lower limit weight may be employed to effect a combinatorial calculation process for thereby preventing a combinatorial calculation error.

Figure 13A:
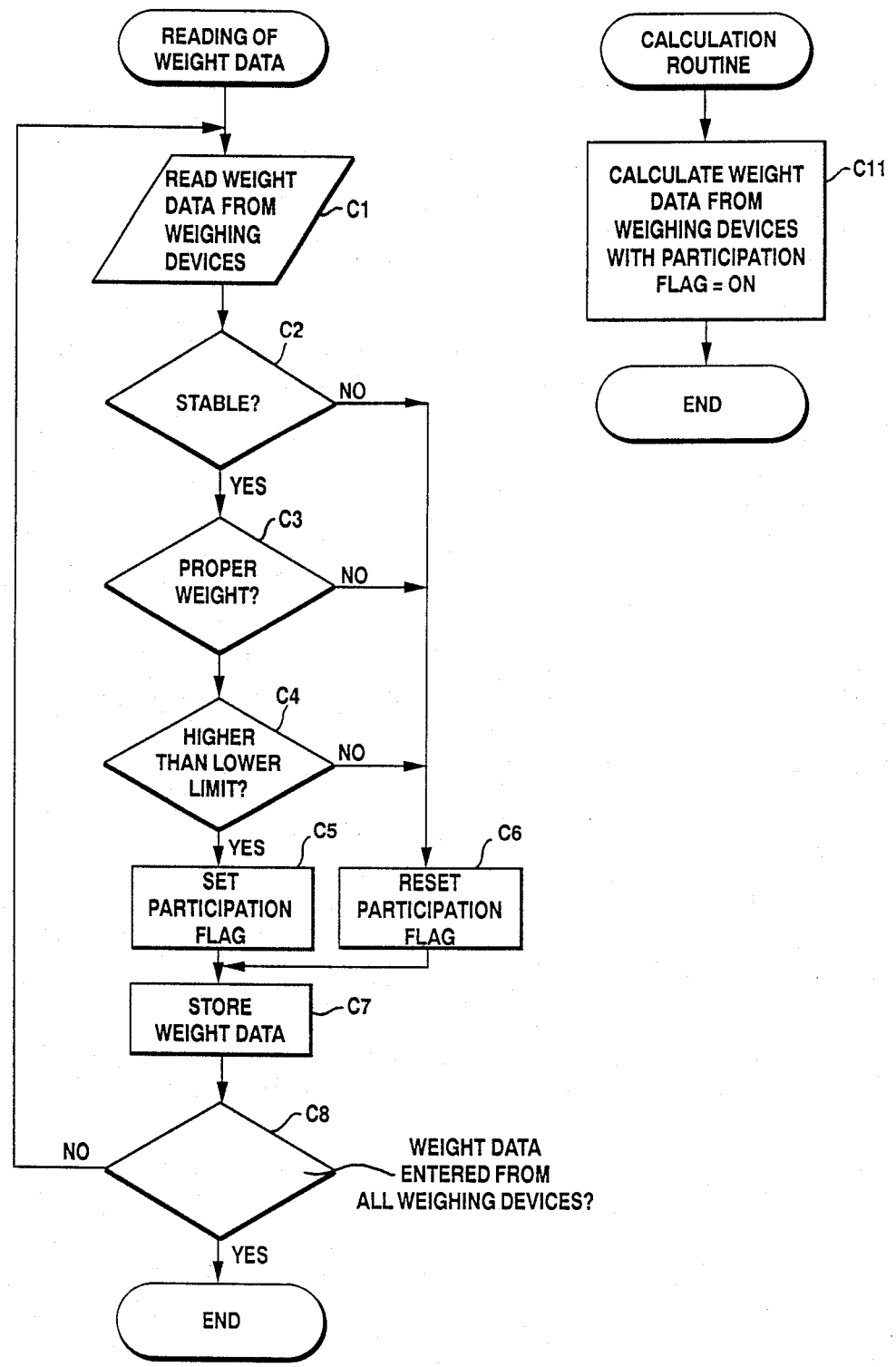
FIGS. 13(a) and 13(b) are flowcharts of processing sequences for preventing an error.
Figure 13B:
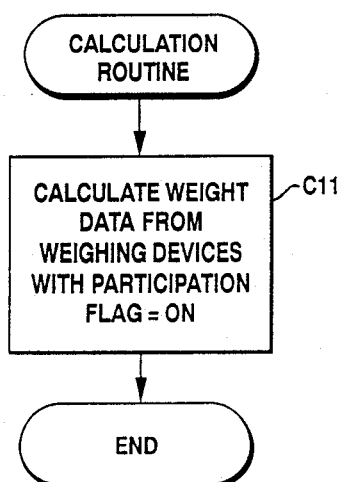

FIGS. 13(a) and 13(b) are flowcharts of processing sequences for preventing such an error.

In the flowchart of FIG. 13(a), a lower limit is provided for weight data items produced by weighing devices. First, weight data items from weighing devices are read by weight sensors in a step C1. A step C2 then checks whether the weighing devices have become stable. If the weighing devices have become stable, then a step C3 ascertains whether the weight data items are proper or not. If yes, then a step C4 checks if the weight data items are greater than a lower limit. The lower limit can variably be set by the input key pad, and may be 5 g, for example.

If the weight data item from a weighing device is higher than the lower limit, a participation flag is set for the weighing device in a step C5, and the weight data item is stored in a step C7.

If the weight data item is not higher than the lower limit in the step C4, then the participation flag is reset in a step C6.

After the weight data item has been stored in the step C7, a step C8 checks if the weight data items from all of the weighing devices have been entered or not. The process beginning with the step C1 is repeated until all of the weight data items are entered.

FIG. 13(b) shows a calculation routine in which a combinatorial calculation process is executed in a step C11 only with respect to those weighing devices which produce weight data higher than the lower limit (step C4 in FIG. 13(a)) and for which the participation flag is ON, so that weighing devices giving an optimum weight combination will be selected.

In this embodiment, a lower limit is established for weight data items detected by the weighing devices, and a combinatorial calculation process is executed only with respect to those weighing devices which produce weight data higher than the lower limit. Therefore, those weighing devices which carry no articles will not take part in any combinatorial calculation process.

In the manual combinatorial weighing apparatus of the present invention, the weight value as measured may not fall within a prescribed weight range dependent on how articles are placed on scale plates. To prevent this, the manual combinatorial weighing apparatus may have means for determining whether a weight combination outside of and closest to such a prescribed weight range should be indicated or not.

Figure 14:
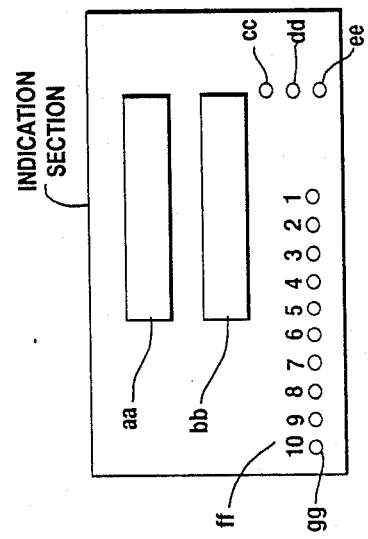
FIG. 14 is a diagram showing a display panel of a display unit of the manual combinatorial weighing apparatus.

FIG. 14 shows in detail a display panel of the display unit h of the manual combinatorial weighing apparatus having the aforesaid means. The display panel includes a combined weight display aa, a target weight display bb, an excess lamp cc, a proper weight lamp dd, a shortage lamp ee, a weighing device number indicator ff, and indicator lamps gg.

Operation of the manual combinatorial weighing apparatus is as follows: When the operator places articles on the main scale and the subscales, or the weighing devices, weight data items as converted to digital values are applied to the CPU of the control unit and stored in the memory. The CPU effects a combinatorial calculation process in a prescribed pattern on the weight data items stored in the memory, and finds an optimum combination pattern with respect to a target weight and also combination patterns under and over and closest to the target weight (proper weight).

When a proper weight combination is obtained by the combinatorial calculation process, the indicator lamps b of the corresponding weighing devices that are selected, and the indicator lamps gg corresponding to the weighing device numbers on the display unit are energized, and the operator removes articles from the corresponding weighing devices and packages them.

If no proper weight combination is obtained by the combinatorial calculation process, then a pattern of weighing devices closest to the proper weight range is selected, and the weight given thereby, whether it may be lighter or excessive, is indicated, and the indicator lamps of the corresponding weighing devices are flickered. Then, the operator increases or reduces the articles on these weighing devices until a proper weight combination is reached.

In the present invention, the input key pad includes a hold key. If the hold key is depressed when no proper weight combination is obtained during a combinatorial calculation process and either a weight combination under and closest to the target weight or a weight combination over and closest to an upper limit weight is indicated and its combined weight is displayed, the indication of the combination pattern is held. The operator now adds, reduces, or replaces articles on any of the weighing devices included in the combination pattern that is held indicated, and only those weight data items from the weighing devices included in this combination pattern are added, and the total weight is displayed.

Heretofore, when no proper weight combination is obtained, those weighing devices to or from which articles are to be added or reduced are fixed, and articles should be replaced. According to the present invention, the weighing devices are fixed only when the hold key is pushed, and may selectively be fixed by the hold key when no proper weight combination is obtained. The problem of not obtaining a proper weight combination can be solved by adding, reducing, or replacing articles. This can be done quickly by the operator dependent on the shape, size, and other features of the articles.

Figure 15:
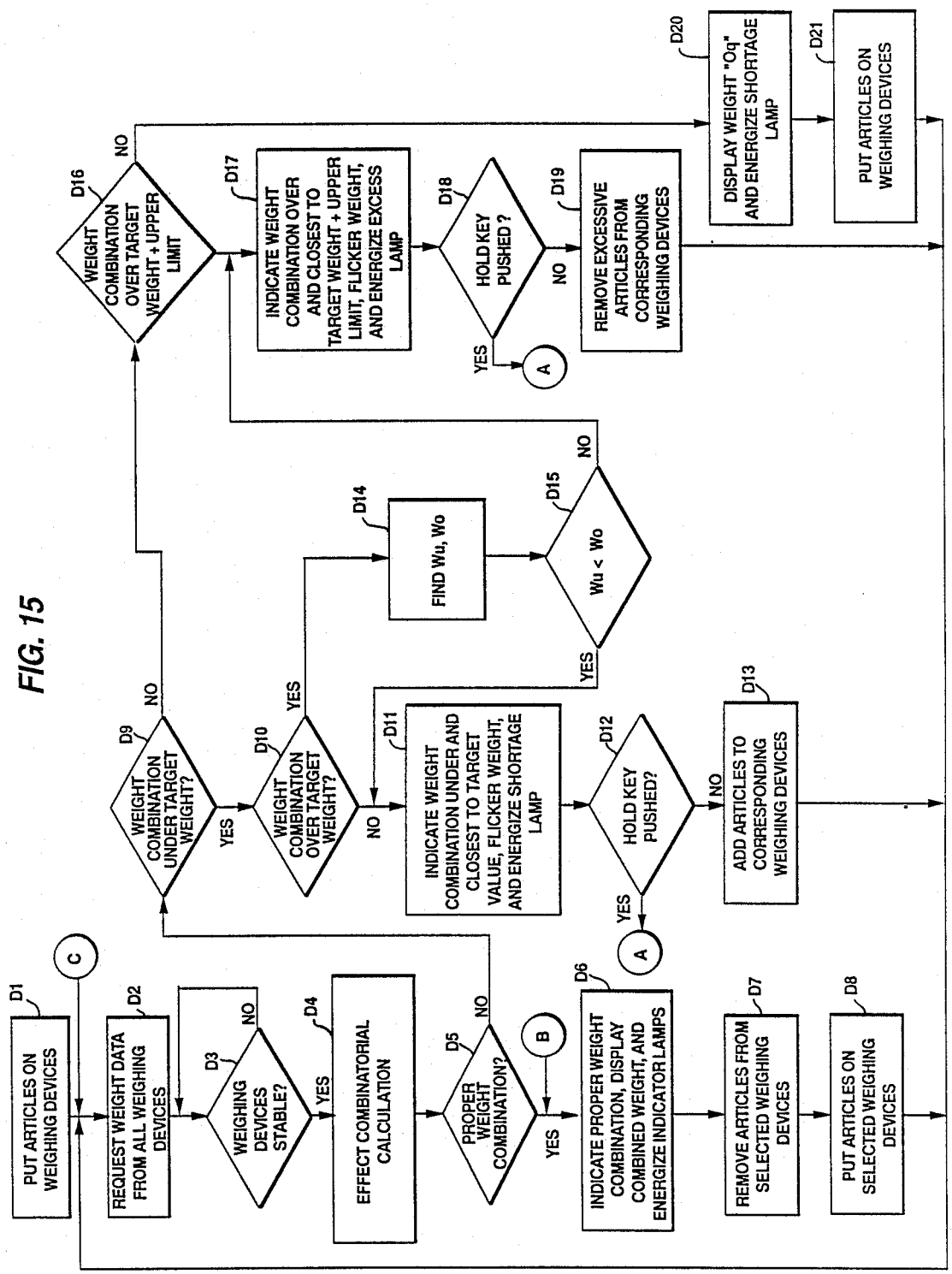
FIG. 15 is a flowchart of a processing sequence according to a further embodiment of the present invention.

FIG. 15 is a flowchart of the above operation sequence. Operation of the combinatorial weighing apparatus will be described with reference to the flowchart of FIG. 15.

(1) Articles are placed on all of the weighing devices in a step D1, and weight data items are requested from all of the weighing devices in a step D2. Then, a step D3 ascertains whether the weighing devices are stable or not. A combinatorial calculation process is effected in a prescribed pattern in a step D4, which is followed by a step D5 that checks where there is a proper weight combination. If there is a proper weight combination obtained, the proper weight combination is indicated, the combined weight is displayed, and the proper weight lamp dd is energized in a step D6. The articles are removed from the corresponding weighing devices in a step D7, and other articles are placed on these weighing devices in a step D8.

(2) If no proper weight combination is obtained in the step D5, control goes to a step D9 which checks whether there is a weight combination under a target weight. If yes, then a step D10 checks if there is a weight combination over the target weight. If not, a weight combination under and closest to the target weight is indicated, the combined weight is flickered on the display, and the shortage lamp ee is energized in a step D11. If it is confirmed that the hold key is not depressed in a step D12, articles are added to the corresponding weighing devices in a step D13. At this time, articles may be added, reduced, or replaced on the other weighing devices.

(3) If there is a weight combination over the target weight in the step D10, then Wu=(the target)−(the combined weight under and closest to the target, and Wo=(the target+the combined weight over and closest to the upper limit)−(the target+the upper limit)

are calculated in a step D14. Then, Wu and Wo are compared in a step D15. If Wu<Wo, control goes to the step D11, and if not control goes to a step D17.

(4) If it is confirmed that there is no weight combination under the target weight in the step D9, a step D16 checks whether there is a weight combination over the target weight+the upper limit. If yes, then a weight combination over and closest the target weight+the upper limit is indicated, its combined weight is displayed, and the excess lamp cc is energized in a step D17. After it is confirmed that the hold key is not depressed in a step D18, excessive articles are removed from the corresponding weighing devices in a step D19. At this time, articles may be added, reduced, or replaced on the other weighing devices.

(5) If the answer to the decision step D16 is NO, then the weight "0 g" is displayed and the shortage lamp ee is energized in a step D20, and articles are placed on the weighing devices in a step D21.

(6) If the hold key is depressed in the steps D12, D18, control goes to a step D51. In the step D51, weight data items are requested from only the corresponding weighing devices. Only these weight data items are added in a step D52. If a proper weight combination is obtained in a step D53, control goes to the step D6, and if not a step D54 checks if the weight is lighter or not. If the weight is lighter, then the shortage lamp ee is energized, the total weight is flickered on the display, and the corresponding combination pattern is indicated in a step D55. Then, articles are added to the corresponding weighing devices in a step D56. When it is confirmed that a hold-release key is pushed in a step D57, control goes back to the step D2 for requesting the weight data items from all of the weighing devices.

If the weight is not lighter in the step D54, the excess lamp cc is energized, the total weight is flickered on the display, and the corresponding combination pattern is indicated in a step D58. Then, excessive articles are taken off the corresponding weighing devices.

According to the above process, where articles with a large unit weight and a fixed shape, such as fish slices, are to be weighed, a proper weight combination can easily be obtained by replacing the articles and effecting a combinatorial calculation process again. Where articles with a small unit weight which can easily be increased or reduced, such as candies, are to be weighed, a proper weight combination can be obtained by not effecting a combinatorial calculation process again but checking the weight data items from the weighing devices and adding or subtracting articles. In this case, a pattern of lighter or excessive weights is not varied inadvertently and a proper weight combination is obtained by fixing weighing devices with lighter or excessive weights and adjusting the weight data items from these weighing devices.

With the aforesaid embodiment, as described above, if no proper weight combination is obtained with respect to a target weight, whether weighing devices to or from which articles are to be added or reduced are to be fixed and whether articles are to be removed, added, or replaced, are determined dependent on the properties of articles being handled. The operator can therefore easily obtain a proper weight combination. When no proper weight combination is obtained, those weighing devices which produce weight data close to the proper weight range, and the weight data and the combination pattern are flickered on the display, so that the operator can take a suitable action smoothly.

Although certain preferred embodiments have been shown and described, it should be understood that many changes and modifications may be made therein without departing from the scope of the appended claims.

What we claim is:

1. A manual combinatorial weighing apparatus, having a plurality of weighing devices for carrying articles that are manually placed thereon, for combining weight data items obtained from the weighing devices to determine an optimum weight combination with respect to a preset target weight, said manual combinatorial weighing apparatus comprising:

a plurality of casings housing respective groups of said weighing devices;
   a plurality of indicators mounted on said casings in association with said weighing devices, respectively, for indicating those weighing devices which are selected as giving the optimum weight combination;
   processing means for combining weight data items obtained from said weighing devices to select a weight combination having a total weight identical or close to said target weight;
   control means for generating signals to energize the indicators corresponding to the weighing devices which give the selected weight combination;
   hold means operable either manually or automatically for holding said indicators energized when a hold key is operated or when the articles are removed from those weighing devices which are selected as giving the optimum weight combination; and
   control means for detecting when the data items from those weighing devices which are selected as giving the optimum weight combination are cleared to zero or a negative value to de-energize said indicators.

2. A manual combinatorial weighing apparatus according to claim 1, wherein said processing means and said control means are disposed separately from said casings.

3. A manual combinatorial weighing apparatus according to claim 1, further including control means for combining the weight data items from said weighing devices again after the weighing devices are selected as giving the weight combination, and for correcting the indication of said indicators if a combined weight produced in the present combination is closer to said target weight than a combined weight produced in the preceding combination.

4. A manual combinatorial weighing apparatus according to claim 1, wherein said processing means and said control means are disposed in one of said casings.

5. A manual combinatorial weighing apparatus, having a plurality of weighing devices for carrying articles that are manually placed thereon, for combining weight data items obtained from the weighing devices to determine an optimum weight combination with respect to a preset target weight, said manual combinatorial weighing apparatus comprising:

a plurality of casings housing respective groups of said weighing devices;
   a plurality of indicators mounted on said casings in association with said weighing devices, respectively, for indicating those weighing devices which are selected as giving the optimum weight combination;
   processing means for combining weight data items obtained from said weighing devices to select a weight combination having a total weight identical or close to said target weight;
   control means for generating signals to energize the indicators corresponding to the weighing devices which give the selected weight combination;
   hold means for holding said indicators energized over a prescribed period of time;
   control means for producing signals to de-energize said indicators when the articles are removed from the weighing devices and the weight data items therefrom are below a prescribed weight level, said weight level being variable;
   means for setting a lower limit for the weight data items detected respectively by said weighing devices, and control means for allowing those weighing devices which produce weight data items in excess of said lower limit to combine said weight data items thereof; and
   wherein if no proper weight combination over said target weight and under an upper limit weight is obtained, further including:
   first means for automatically indicating a first weight combination under and closest to said target weight or a second weight combination over and closest to said upper limit weight, and for automatically displaying a total weight of said first and second weight combination;
   second means for selecting and holding energized the indicators for the weighing devices giving said first and second weight combination while said first means is in operation; and
   means for selectively operating said first and second means.

6. A manual combinatorial weighing apparatus, having a plurality of weighing devices for carrying articles that are manually placed thereon, for combining weight data items obtained from the weighing devices to determine an optimum weight combination with respect to a preset target weight, said manual combinatorial weighing apparatus comprising:

a plurality of casings housing respective groups of said weighing devices;
   a plurality of indicators mounted on said casing in association with said weighing devices, respectively, for indicating those weighing devices which are selected as giving the optimum weight combination;
   processing means for combining weight data items obtained from said weighing devices to select a weight combination having a total weight identical or close to said target weight;
   control means for generating signals to energize the indicators corresponding to the weighing devices which give the selected weight combination; and
   further including means for setting a lower limit for the weight data items detected respectively by said weighing devices, and control means for allowing those weighing devices which produce weight data items in excess of said lower limit to combine said weight data items thereof.

7. A manual combinatorial weighing apparatus, having a plurality of weighing devices for carrying articles that are manually placed thereon, for combining weight data items obtained from the weighing devices to determine an optimum weight combination with respect to a preset target weight, said manual combinatorial weighing apparatus comprising:
- a plurality of casings housing respective groups of said weighing devices;
- a plurality of indicators mounted on said casings in association with said weighing devices, respectively, for indicating those weighing devices which are selected as giving the optimum weight combination;
- processing means for combining weight data items obtained from said weighing devices to select a weight combination having a total weight identical or close to said target weight;
- control means for generating signals to energize the indicators corresponding to the weighing devices which give the selected weight combination; and
- wherein if no proper weight combination over said target weight and under an upper limit weight is obtained, further including:
  - first means for automatically indicating a first weight combination under and closest to said target weight or a second weight combination over and closest to said upper limit weight, and for automatically displaying a total weight of said first or second weight combination;
  - second means for selecting and holding energized the indicators for the weighing devices giving first or second weight combination while said first means is in operation; and
  - means for selectively operating said first and second means.

8. A manual combinatorial weighing apparatus, having a plurality of weighing devices for carrying articles that are manually placed thereon, for combining weight data items obtained from the weighing devices to determine an optimum weight combination with respect to a preset target weight, said manual combinatorial weighing apparatus comprising:
- a plurality of casings housing respective groups of said weighing devices;
- a plurality of indicators mounted on said casings in association with said weighing devices, respectively, for indicating those weighing devices which are selected as giving the optimum weight combination;
- processing means for combining weight data items obtained from said weighing devices to select a weight combination having a total weight identical or close to said target weight;
- control means for generating signals to energize the indicators corresponding to the weighing devices which give the selected weight combination;
- hold means for holding said indicators energized over a prescribed period of time;
- control means for producing signals to de-energize said indicator when the articles are removed from the weighing devices and the weight data items therefrom are below a prescribed weight level; and
- further including means for setting a lower limit for the weight data items detected respectively by said weighing devices, and control means for allowing those weighing devices which produce weight data items in excess of said lower limit to combine said weight data items thereof.

9. A manual combinatorial weighing apparatus, having a plurality of weighing devices for carrying articles that are manually placed thereon, for combining weight data items obtained from the weighing devices to determine an optimum weight combination with respect to a preset target weight, said manual combinatorial weighing apparatus comprising:
- a plurality of casings housing respective groups of said weighing devices;
- a plurality of indicators mounted on said casings in association with said weighing devices, respectively, for indicating those weighing devices which are selected as giving the optimum weight combination;
- processing means for combining weight data items obtained from said weighing devices to select a weight combination having a total weight identical or close to said target weight;
- control means for generating signals to energize the indicators corresponding to the weighing devices which give the selected weight combination;
- hold means for holding said indicators energized over a prescribed period of time;
- control means for producing signals to de-energize said indicator when the articles are removed from the weighing devices and the weight data items therefrom are below a prescribed weight level; and
- wherein if no proper weight combination over said target weight and under an upper limit weight is obtained, further including:
  - first means for automatically indicating a first weight combination under and closest to said target weight or a second weight combination over and closest to said upper limit weight, and for automatically displaying a total weight of said first or second weight combination;
  - second means for selecting and holding energized the indicators for the weighing devices giving first or second weight combination while said first means is in operation; and
  - means for selectively operating said first and second means.

10. A manual combinatorial weighing apparatus, having a plurality of weighing devices for carrying articles that are manually placed thereon, for combining weight data items obtained from the weighing devices to determine an optimum weight combination with respect to a preset target weight, said manual combinatorial weighing apparatus comprising:
- a plurality of casings housing respective groups of said weighing devices;
- a plurality of indicators mounted on said casings in association with said weighing device, respectively, for indicating those weighing devices which are selected as giving the optimum weight combination;
- processing means for combining weight data items obtained from said weighing devices to select a weight combination having a total weight identical or close to said target weight;
- control means for generating signals to energize the indicators corresponding to the weighing devices which give the selected weight combination;
- hold means for holding said indicators energized when a hold key is operated or when the articles are removed from those weighing devices which are selected as giving the optimum weight combination;

control means for detecting when the weight data items from those weighing devices which are selected as giving the optimum weight combination are cleared to zero or a negative value to de-energize said indicators; and further including means for setting a lower limit for the weight data items detected respectively by said weighing devices, and control means for allowing those weighing devices which produce weight data items in excess of said lower limit to combine said weight data items thereof.

11. A manual combinatorial weighing apparatus, having a plurality of weighing devices for carrying articles that are manually placed thereon, for combining weight data items obtained from the weighing devices to determine an optimum weight combination with respect to a preset target weight, said manual combinatorial weighing apparatus comprising:

a plurality of casings housing respective groups of said weighing devices;

a plurality of indicators mounted on said casings in association with said weighing devices, respectively, for indicating those weighing devices which are selected as giving the optimum weight combination;

processing means for combining weight data items obtained from said weighing devices to select a weight combination having a total weight identical or close to said target weight;

control means for generating signals to energize the indicators corresponding to the weighing devices which give the selected weight combination;

hold means for holding said indicators energized when a hold key is operated or when the articles are removed from those weighing devices which are selected as giving the optimum weight combination;

control means for detecting when the weight data items from those weighing devices which are selected as giving the optimum weight combination are cleared to zero or a negative value to de-energize said indicators; and wherein if proper weight combination over said target weight and under an upper limit weight is obtained, further including:

first means for automatically indicating a first weight combination under and closest to said target weight or a second weight combination over and closest to said upper limit weight, and for automatically displaying a total weight of said first or second weight combination;

second means for selecting and holding energized the indicators for the weighing devices giving said first or second weight combination while said first means is in operation; and means for selectively operating said first and second means.

* * * * *

UNITED STATES PATENT AND TRADEMARK OFFICE
CERTIFICATE OF CORRECTION

PATENT NO. : 4,838,368
DATED : June 13, 1989
INVENTOR(S) : HIROKAZU SATO et al.

It is certified that error appears in the above-identified patent and that said Letters Patent is hereby corrected as shown below:

Column 1, line 23 "artiches" should be --articles--.

Column 2, line 27, after "weight" insert --combination--.

Column 3, line 43, delete "or not".

Column 4, line 31, "prsent" should be --present--;

line 34, "prsent" should be --present--;

line 66, "N" should be --n--;

line 68, "K" should be --k--.

Column 6, line 29, delete "and";

line 57, "-b" should be --b--;

Column 7, line 60, "lmap" should be --lamp--.

Column 10, line 66, "installtion" should be --installation--.

Column 11, line 28, "targe" should be --target--.

Column 12, line 17, "targe" should be --target--.

Column 12, line 32, "stp" should be --step--.

Column 13, line 32, "ar" should be --are--.

UNITED STATES PATENT AND TRADEMARK OFFICE
CERTIFICATE OF CORRECTION

PATENT NO. : 4,838,368

DATED : June 13, 1989

INVENTOR(S) : Hirokazu Sato et al

It is certified that error appears in the above-identified patent and that said Letters Patent is hereby corrected as shown below:

Column 16, line 19 "depresed" should be --depressed--.

Signed and Sealed this

Twenty-fourth Day of April, 1990

- Attest:

HARRY F. MANBECK, JR.

*Attesting Officer*  *Commissioner of Patents and Trademarks*